(12) United States Patent
Andre et al.

(10) Patent No.: US 7,107,757 B2
(45) Date of Patent: Sep. 19, 2006

(54) AIRCRAFT PROVIDED WITH THRUST REVERSERS

(75) Inventors: Joan Andre, Colomiers (FR); Laurent Andrieu, Aucamville (FR)

(73) Assignee: Airbus France, Toulouse (FR)

( * ) Notice: Subject to any disclaimer, the term of this patent is extended or adjusted under 35 U.S.C. 154(b) by 127 days.

(21) Appl. No.: 10/932,342

(22) Filed: Sep. 2, 2004

(65) Prior Publication Data

US 2005/0116096 A1 Jun. 2, 2005

(30) Foreign Application Priority Data

Sep. 3, 2003 (FR) .................................. 03 10417

(51) Int. Cl.
*F02K 3/02* (2006.01)
(52) U.S. Cl. .................... 60/226.2; 60/224; 244/75 R
(58) Field of Classification Search ................ 60/233, 60/224, 226.2
See application file for complete search history.

(56) References Cited

U.S. PATENT DOCUMENTS

| | | | | |
|---|---|---|---|---|
| 3,286,470 | A * | 11/1966 | Gerlaugh | 60/229 |
| 3,572,155 | A | 3/1971 | Banks | |
| 3,614,028 | A * | 10/1971 | Kleckner | 244/15 |
| 3,731,489 | A * | 5/1973 | Monaghan et al. | 60/226.2 |
| 3,774,864 | A * | 11/1973 | Hurkamp | 244/13 |
| 3,874,620 | A * | 4/1975 | Kahler et al. | 244/110 B |
| 3,887,146 | A * | 6/1975 | Bright | 244/12.1 |
| 4,311,289 | A * | 1/1982 | Finch | 244/55 |
| 4,836,469 | A * | 6/1989 | Wagenfeld | 244/1 N |
| 5,100,082 | A * | 3/1992 | Archung | 244/78.1 |
| 5,230,213 | A * | 7/1993 | Lawson | 60/226.2 |
| 5,375,793 | A * | 12/1994 | Rivron et al. | 244/99.8 |
| 5,379,969 | A * | 1/1995 | Marx et al. | 244/49 |
| 5,443,229 | A * | 8/1995 | O'Brien et al. | 244/54 |
| 5,529,263 | A * | 6/1996 | Rudolph | 244/55 |
| 5,667,170 | A * | 9/1997 | Moss et al. | 244/135 A |
| 5,671,598 | A * | 9/1997 | Standish | 60/266.2 |
| 6,044,641 | A * | 4/2000 | Baudu et al. | 60/226.2 |
| 6,094,908 | A * | 8/2000 | Baudu et al. | 60/226.2 |
| 6,151,884 | A * | 11/2000 | Gonidec et al. | 60/226.2 |
| 6,233,920 | B1 * | 5/2001 | Presz et al. | 60/230 |
| 6,241,183 | B1 * | 6/2001 | Mathieu | 244/99.11 |
| 6,264,135 | B1 * | 7/2001 | Dacosta | 244/1 R |
| 6,311,928 | B1 | 11/2001 | Presz, Jr. et al. | |
| 6,622,964 | B1 * | 9/2003 | Rouyer et al. | 244/110 B |
| 6,634,596 | B1 * | 10/2003 | Albero et al. | 244/53 A |
| 6,802,479 | B1 * | 10/2004 | Howe et al. | 244/129.1 |
| 6,863,242 | B1 * | 3/2005 | Van De Kreeke et al. | 244/7 R |
| 6,938,854 | B1 * | 9/2005 | Nelson | 244/120 |
| 6,976,352 | B1 * | 12/2005 | Lair | 60/226.2 |
| 6,978,971 | B1 * | 12/2005 | Dun | 244/214 |
| 2002/0117582 | A1 | 8/2002 | Stephan | |

OTHER PUBLICATIONS

Preliminary Search Report dated May 11, 2003 with English translation.

* cited by examiner

*Primary Examiner*—William H. Rodríguez
(74) *Attorney, Agent, or Firm*—Stevens, Davis, Miller & Mosher, LLP

(57) ABSTRACT

Some but not all engines of an aircraft are provided with thrust reversers. A safety device disables, at least from the position corresponding to idling, the action of the throttles corresponding to the engines devoid of thrust reversers when the thrust reversers are controlled to deployment.

12 Claims, 4 Drawing Sheets

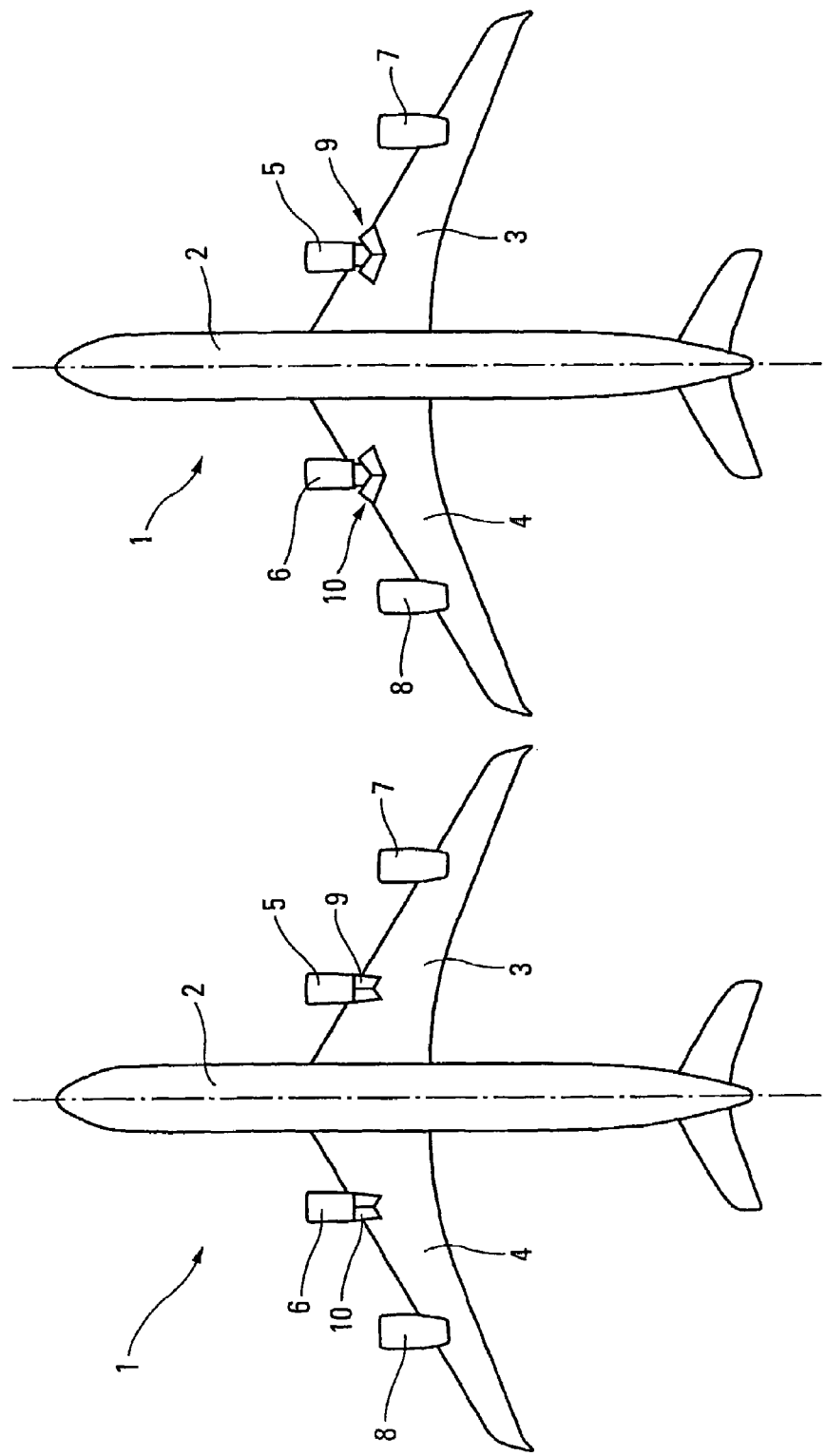

AIRCRAFT PROVIDED WITH THRUST REVERSERS

FIELD OF THE INVENTION

The present invention relates to an aircraft provided with thrust reversers.

BACKGROUND OF THE RELATED ART

It is known that numerous aircraft, in particular those intended for civil transport, are equipped with thrust reversers making it possible to improve the braking of said aircraft during landing. These thrust reversers are associated with the engines of the aircraft and they are controllable so as to be able to go from an inactive retracted position to an active deployed position and, conversely from said active deployed position to said inactive retracted position. In the active deployed position, a thrust reverser receives the jet of the associated engine and reverses said jet, thus allowing it to participate in the braking of the aircraft.

In a general manner, the engines of an aircraft are equipped with a thrust reverser. The activation of the thrust reverser of an engine is triggered by the pilot by means of a member, of the lever type, disposed on the throttle corresponding to this engine. An action on this lever is possible only if the throttle is in a position corresponding to the idling of the engine.

The extra braking afforded to the brakes of an aircraft on the ground by a thrust reverser is very considerable, so that, in particular in the case of a multi-engine aircraft, the braking capacity of all the thrust reversers together is overkill. Now, each thrust reverser exhibits a relatively considerable mass and its cost is high. The awkward situation thus prevails whereby the aircraft has to support a mass and costs relating to apparatus—the thrust reversers—that give rise to an unnecessary overkill of braking power. Moreover, the thrust reversers exhibit a non-zero risk of untoward deployment in flight, which may prove to be catastrophic for the aircraft.

SUMMARY OF THE INVENTION

An object of the present invention is to remedy these drawbacks.

To this end, according to the invention, the aircraft provided with a plurality of engines whose speeds are controlled individually, between idling and full speed, by throttles respectively associated with said engines, is noteworthy in that:

certain of said engines of said plurality are equipped with thrust reversers that can be controlled so as to be able to go from an inactive retracted position to an active deployed position and, conversely, from said active deployed position to said inactive retracted position;

the other engines of said plurality are devoid of thrust reversers, and a safety device is provided so as to disable, at least from the position corresponding to idling, the action of the throttles corresponding to said engines devoid of thrust reversers, when said thrust reversers are controlled so as to go from their inactive retracted position to their active deployed position.

Thus, by virtue of the present invention, it is possible to equip only certain engines with thrust reversers able to provide the extra braking necessary to the brakes of the aircraft and to economize, in terms of mass and costs, on the thrust reversers for the other engines, by avoiding dangerous piloting situations for which the engines not provided with thrust reversers might not be idling, although the thrust reversers would be in the active deployed position. Moreover, the present invention makes it possible to reduce the risk of in-flight triggering of the reversers, since the number thereof is reduced.

Of course, the present invention applies to numerous different arrangements of the engines on said aircraft provided that, for stability reasons, the engines equipped with thrust reversers are disposed either in the vertical midplane of the aircraft or symmetric pairwise with respect to this plane. It applies especially well to an aircraft comprising four engines carried by the wings of said aircraft and pairwise symmetric with respect to the fuselage of the latter, so that each wing carries an inboard engine and an outboard engine.

In this case, it is advantageous for said inboard engines to be provided with thrust reversers, while said outboard engines are devoid thereof.

In one embodiment, said safety device comprises a detector of the control of said thrust reversers to deployment and latching means controlled by said detector and latching, when idling, said engines devoid of thrust reversers, these latter engines having previously been brought to idling through an intentional action by a pilot. For this purpose, said latching means can lock, in the position corresponding to idling, the throttles of said engines, devoid of thrust reversers, the latter throttles having previously been brought to this position through an intentional action by a pilot.

According to a preferred embodiment, said safety device comprises a detector of the control of said thrust reversers to deployment and means imposing idling on said engines devoid of thrust reversers, irrespective of the speed of the latter engines. Preferably, said means imposing idling on said engines devoid of thrust reversers act on the fuel supply rate to the latter engines. In the latter case, when said thrust reversers are controlled to deployment, it is indispensable for said means imposing idling to have greater authority than that of said throttles in relation to the control of the fuel supply rate to the engines.

In particular for safety reasons, it is advantageous for said safety device:

to disable the action of said throttles, corresponding to said engines devoid of thrust reversers as soon as at least one of the thrust reversers is controlled to deployment;

to be sensitive to a cue indicating that said aircraft is in contact with the ground and does not disable the action of said throttles corresponding to said engines devoid of thrust reversers unless said aircraft is on the ground;

to be sensitive to a cue representative of a velocity threshold of said aircraft and not to disable the action of said throttles corresponding to said engines devoid of thrust reversers unless the velocity with respect to the ground of said aircraft is greater than said threshold;

to be sensitive to cues representative of the respective positions of said throttles and not to disable the action of said throttles corresponding to said engines devoid of thrust reversers unless said throttles are in a position corresponding to idling, except possibly one or more of the throttles corresponding to said engines devoid of thrust reversers;

to comprise an alarm device activated when at least one of the throttles corresponding to one of said engines devoid of thrust reversers is not in its position corresponding to idling; and to maintain idling on said engines devoid of thrust reversers for a predetermined duration after the end of control to deployment of the thrust reversers and the return of the latter from the active deployment position to the inactive retracted position.

Such a safety device can then comprise computation means, possibly incorporated into one of the onboard computers of the aircraft.

BRIEF DESCRIPTION OF THE DRAWINGS

The figures of the appended drawing will elucidate the manner in which the invention may be embodied. In these figures, identical references designate similar elements.

FIG. 1 shows diagrammatically from below a four-engine aircraft whose inboard engines are each equipped with a thrust reverser, said thrust reversers being in the retracted position.

FIG. 2 is similar to FIG. 1, except as regards the thrust reversers which are represented in the deployed position.

DETAILED DESCRIPTION OF THE INVENTION

Figure 3:
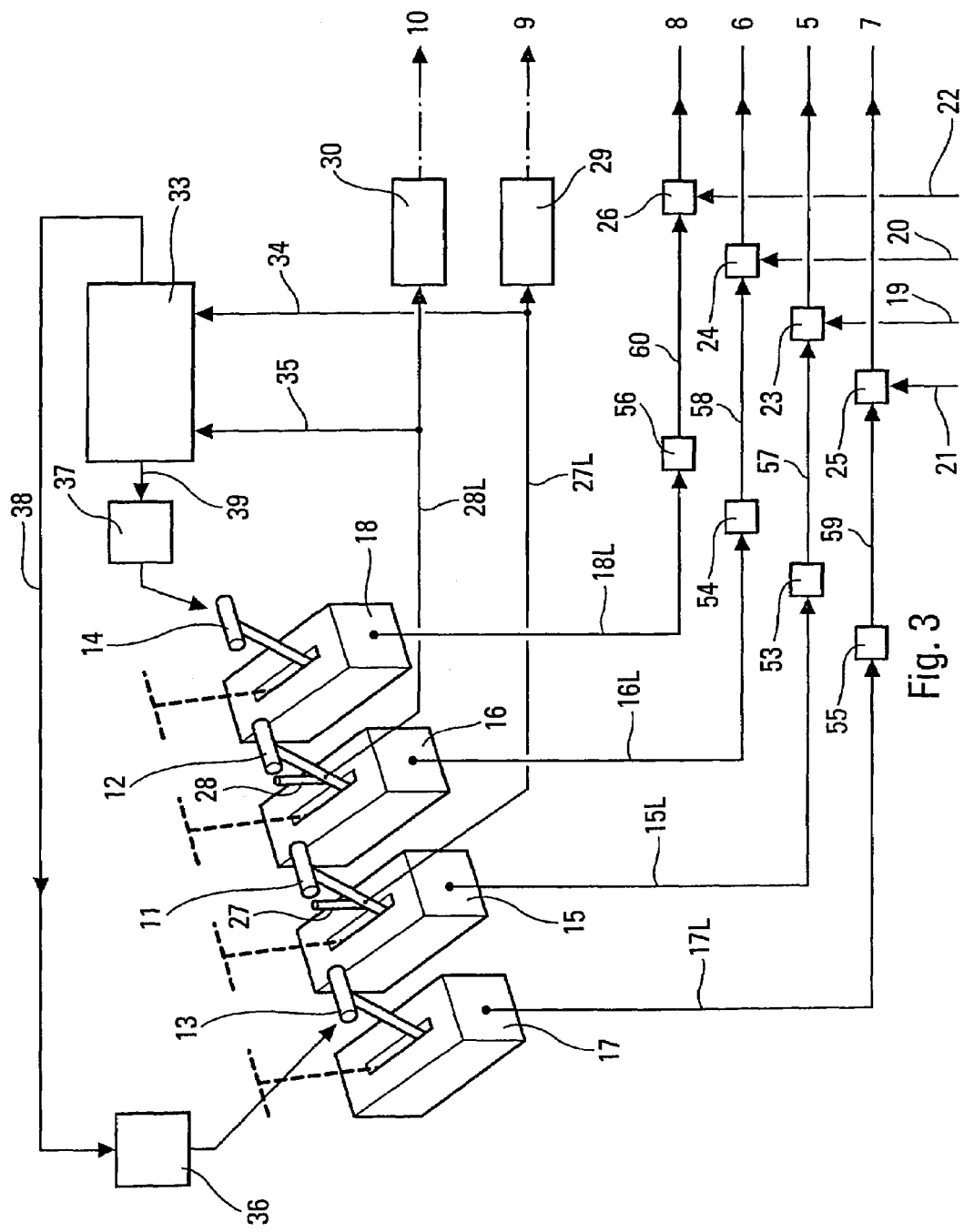
FIG. 3 is the schematic diagram of a first embodiment of the safety device in accordance with the present invention.

The aircraft 1, shown diagrammatically from below in FIGS. 1 and 2, comprises a fuselage 2 and two wings 3 and 4, symmetric with respect to said fuselage. On each of said wings 3 and 4 are mounted an inboard engine 5 or 6 and an outboard engine 7 or 8. The inboard engines 5 and 6 are each equipped with a thrust reverser 9 or 10, while the outboard engines 7 and 8 are devoid of such reversers. In FIGS. 1 and 2, the thrust reversers 9 and 10 have been represented in the form of rear-gate reversers but it goes without saying that they could have a different structure. The thrust reversers 9 and 10 are represented in the retracted position in FIG. 1 and in the deployed position in FIG. 2.

Figure 4:
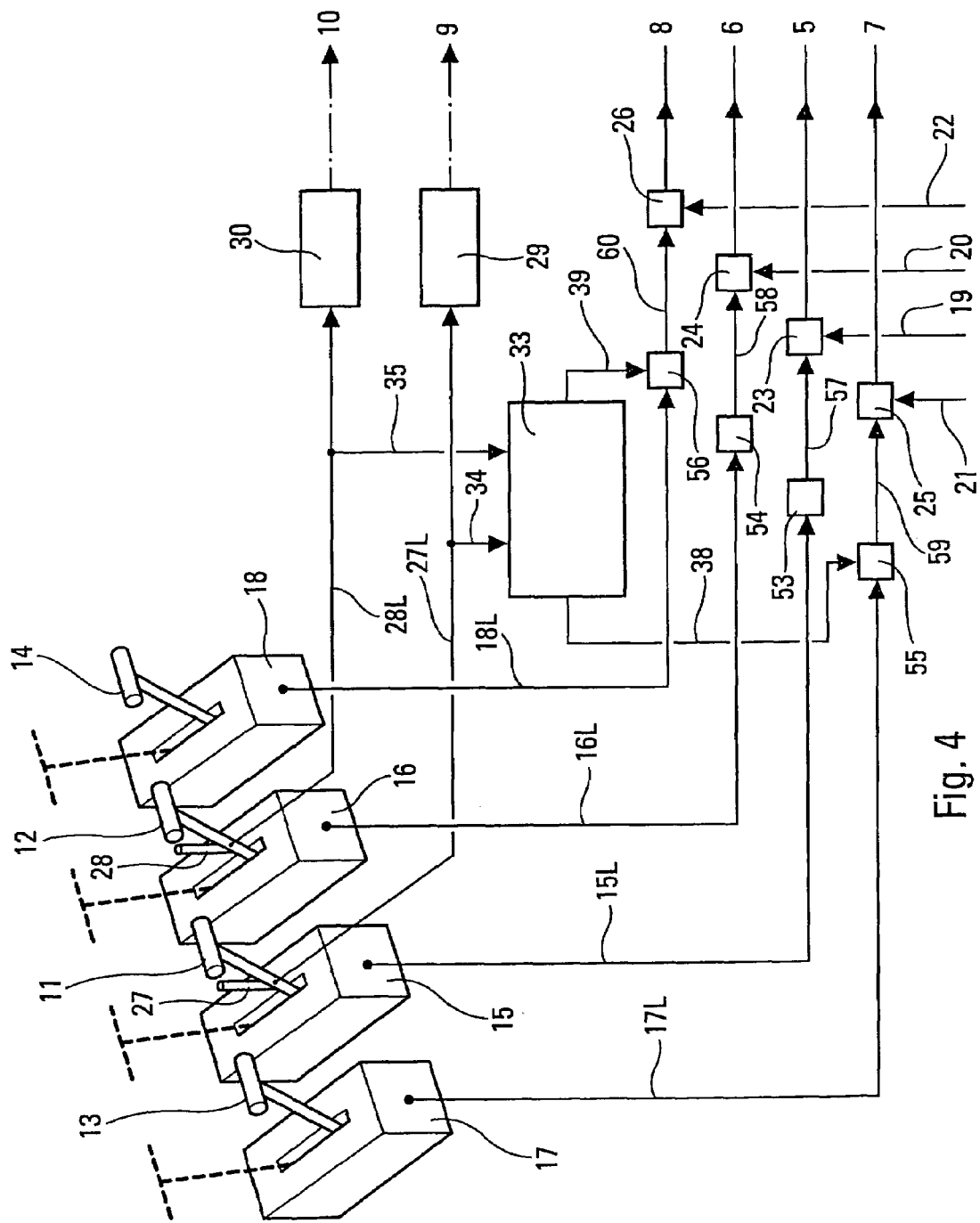
FIG. 4 is the schematic diagram of a second embodiment of the safety device in accordance with the present invention.

As is illustrated diagrammatically in FIGS. 3 and 4, the speed of each engine 5 to 8 is controlled by a pilot, not represented, by way of a specific throttle 11 to 14, associated with a transducer 15 to 18 delivering an electrical signal representative of the position of the corresponding throttle. Each throttle 11 to 14 can occupy any position between a position of maximum speed (represented by dashes) and an idling position (represented by a solid line).

The engines 5 to 8 are supplied with fuel by specific circuits 19 to 22, on each of which is mounted a flow rate control device 23 to 26. The flow rate control devices 23 to 26 are respectively controlled by FADEC (Full Authority Digital Engine Control) computers 53 to 56 whose output signals able to control said flow rate control devices 23 to 26 are transmitted to the latter by way of respective links 57 to 60. These FADEC computers 53 to 56 receive as input, by way of respective links 15L, 16L, 17L and 18L, the output signals from the transducers 15 to 18 which are themselves controlled by the throttles 11 to 14. Generally, the FADEC computers 53 to 56 formulate said output signals able to control the flow rate control devices 23 to 26 as a function in particular of said signals that said FADEC computers 53 to 56 receive respectively from the transducers 15 to 18. Consequently, the flow rate of fuel to the engines 5 to 8, and therefore the speed of said engines generally depends on the respective positions of the throttles 11 to 14.

Furthermore, on each of the throttles 11 and 12, respectively associated with the inboard engines 5 and 6, is mounted a member 27 or 28 able to control to deployment and to retraction the corresponding thrust reverser 9 or 10, by way of an actuation device (for example rams) 29 or 30. For this purpose, each control member 27 and 28 is able to produce, in a known manner that is not represented, a retraction electrical signal and a deployment electrical signal transmitted to the corresponding actuation device 29 or 30 by a respective link 27L or 28L.

The safety device in accordance with the present invention, represented in FIG. 3, comprises:

a detector 33, receiving the retraction and deployment electrical signals flowing around the links 27L and 28L by way of links 34 and 35, respectively; and controllable latching devices 36 and 37, for example of the electromagnet type, respectively associated with the throttles 17 and 18 and controlled by the detector 33, respectively via links 38 and 39.

Thus, when all the throttles 11 to 14 are brought by a pilot into their position corresponding to the idling of the engines 5 to 8, (FIG. 3) and the control members 27 and 28 are actuated, the thrust reversers 9 and 10 deploy and this deployment is detected by the detector 33 (via the links 34, 35). The detector 33 then addresses to the latching devices 36, 37, by way of the links 38, 39, the orders to latch the throttles 13 and 14—associated with the outboard engines 7 and 8 devoid of thrust reversers—in the idling position.

As a result, as long as the thrust reversers 9 and 10 are deployed, the speed of the outboard engines 7 and 8 cannot be increased accidentally. It will be noted that the pilot nevertheless retains the possibility of dispensing with the latching exerted by the devices 36, 37 on the throttles 13, 14 by acting on these throttles with a force greater than the latching forces exerted by these devices 36, 37. This case involves an intentional action by the pilot, the aim of the present invention being to avoid unintentional actions.

On the other hand, as soon as by actuation of the control members 27 and 28 the thrust reversers 9 and 10 are controlled to retraction, the corresponding signal is detected by the detector 33 which disables the latching devices 36 and 37, the throttles 13 and 14 are then freed and it is possible to increase the throttle on the outboard engines 7 and 8.

In the variant embodiment illustrated by FIG. 4, all the elements 5 to 38 (including the links 15L, 16L, 17L, 18L, 27L and 28L) and 53 to 60 described hereinabove are found again. In this case, the detector 33 can control, by virtue of the links 38, 39, the FADEC computers 55 and 56 which respectively control the flow rate control devices 25 and 26 of the outboard engines 7 and 8, devoid of thrust reversers. When a deployment signal traverses the links 27L and 28L, the authority of the detector 33 on the FADEC computers 55 and 56 is greater than that which the throttles 13 and 14 are able to exert on these same FADEC computers. Thus, each of the engines 7 and 8 can be guaranteed to be brought to idling, even if the throttle 13 and/or the throttle 14 is not in the position corresponding to idling.

As described previously, on retraction of the thrust reversers 9 and 10, the detector 33 no longer disables the action of the throttles 13 and 14.

Figure 5:
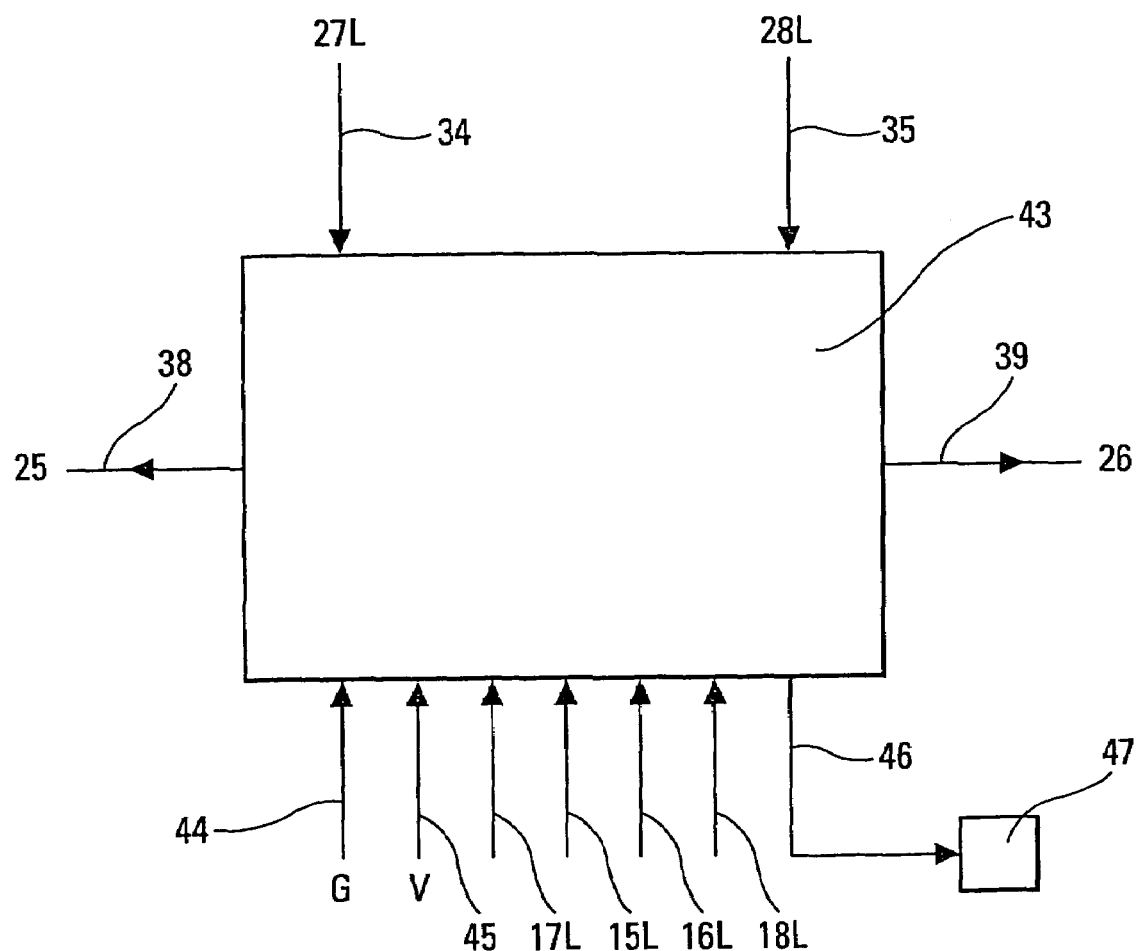
FIG. 5 illustrates, diagrammatically and partially, a third embodiment of said safety device.

Represented in FIG. 5 is a more complete embodiment 43 of the detector 33, in particular in its application to the device of FIG. 4. This detector 43 is of the computer type and it can be integrated into one of the flight computers of the aircraft 1, for example a flight controls computer addressing instructions to the FADEC computers 53 to 56 providing for the command of the engines 5 to 8 of said aircraft.

The detector 43, in addition to its inputs 34 and 35 connected to the links 27L and 28L as described hereinabove, comprises:

an input 44, on which appears a signal G, for example tapped off in a known manner from the landing gear, representative of the fact that the aircraft 1 is in contact with the ground;

an input 45, on which appears a signal V representative of the velocity with respect to the ground of the aircraft 1; and inputs 15L, 16L, 17L and 18L on which appear signals representative of the position of the throttles 11, 12, 13 and 14, as indicated hereinabove.

Furthermore, in addition to its outputs 38 and 39, the detector 43 comprises an output 46 connected to an alarm device 47.

Thus, it is possible, for safety reasons, not to force the outboard engines 7 and 8 to idling unless the following conditions are present in isolation or in combination:

the aircraft 1 is in contact with the ground;

the velocity with respect to the ground of the aircraft is greater than a predetermined threshold, for example, equal to 30 knots (indeed, if the velocity of the aircraft is small, the consequences of an incident arising during the activation of the thrust reversers are also small);

all the throttles 11 to 14 are in a position corresponding to idling, except possibly at least one of the two throttles 13 or 14;

at least one of the thrust reversers 9 or 10 is controlled to deployment.

Furthermore, if one of the engines 7 or 8 is forced to idling, while the corresponding throttle 13 or 14 is not in a position corresponding to idling, the alarm device 47 is triggered to warn the pilot of the anomaly.

Upon the return of the thrust reversers 9 and 10 to the retracted position, it is advantageous for the detector 33 or 43 to maintain for a predetermined duration, for example equal to 30 seconds, idling on the outboard engines 7 and 8. Thus, even if the pilot unintentionally actuates the throttle 13 or 14 of one of these engines while wishing to retract the thrust reversers 9 and 10, no incident detrimental to the aircraft 1 results therefrom.

The invention claimed is:

1. An aircraft provided with a plurality of engines whose speeds are controlled individually, between idling and full speed, by throttles respectively associated with said engines, wherein:

certain of said engines of said plurality are equipped with thrust reversers that are operable to be controlled so as to be able to go from an inactive retracted position to an active deployed position and, conversely, from said active deployed position to said inactive retracted position;

other engines of said plurality are devoid of thrust reversers, and a safety device is provided so as to disable, at least from the position corresponding to idling, the action of the throttles corresponding to said engines devoid of thrust reversers, when said thrust reversers are controlled so as to go from their inactive retracted position to their active deployed position.

2. The aircraft as claimed in claim 1, wherein said engines comprise four engines carried by the wings of said aircraft and pairwise symmetric with respect to the fuselage of the latter, so that each wing carries an inboard engine and an outboard engine wherein said inboard engines are provided with thrust reversers whereas said outboard engines are devoid thereof.

3. The aircraft as claimed in claim 1, wherein said safety device comprises a detector of the control of said thrust reversers to deployment and latching components controlled by said detector and latching, when idling, said engines devoid of thrust reversers, these latter engines having previously been brought to idling through an intentional action.

4. The aircraft as claimed in claim 3, wherein said latching components lock, in the position corresponding to idling, the throttles of said engines devoid of thrust reversers, the latter throttles having previously been brought to said position corresponding to idling through an intentional action.

5. The aircraft as claimed in claim 1, wherein said safety device comprises a detector of the control of said thrust reversers to deployment and idling units imposing idling on said engines devoid of thrust reversers, irrespective of the speed of the latter engines.

6. The aircraft as claimed in claim 5, wherein said idling units imposing idling on said engines devoid of thrust reversers act on the fuel supply rate to the latter engines.

7. The aircraft as claimed in claim 1, wherein said safety device disables the action of said throttles, corresponding to said engines devoid of thrust reversers as soon as at least one of the thrust reversers is controlled to deployment.

8. The aircraft as claimed in claim 1, wherein said safety device is sensitive to a cue indicating that said aircraft is in contact with the ground and does not disable the action of said throttles corresponding to said engines devoid of thrust reversers unless said aircraft is on the ground.

9. The aircraft as claimed in claim 1, wherein said safety device is sensitive to a cue representative of a velocity threshold with respect to the ground of said aircraft and does not disable the action of said throttles corresponding to said engines devoid of thrust reversers unless the velocity with respect to the ground of said aircraft is greater than said threshold.

10. The aircraft as claimed in claim 1, wherein said safety device is sensitive to cues representative of the respective positions of said throttles and does not disable the action of said throttles corresponding to said engines devoid of thrust reversers unless said throttles are in a position corresponding to idling, except possibly one or more of the throttles corresponding to said engines devoid of thrust reversers.

11. The aircraft as claimed in claim 10, which comprises an alarm device activated by said safety device when at least one of the throttles corresponding to one of said engines devoid of thrust reversers is not in the position corresponding to idling.

12. The aircraft as claimed in claim 1, wherein said safety device maintains idling on said engines devoid of thrust reversers for a predetermined duration after the end of control to deployment of the thrust reversers and the return of the latter from the active deployment position to the inactive retracted position.

* * * * *